Figure 1:
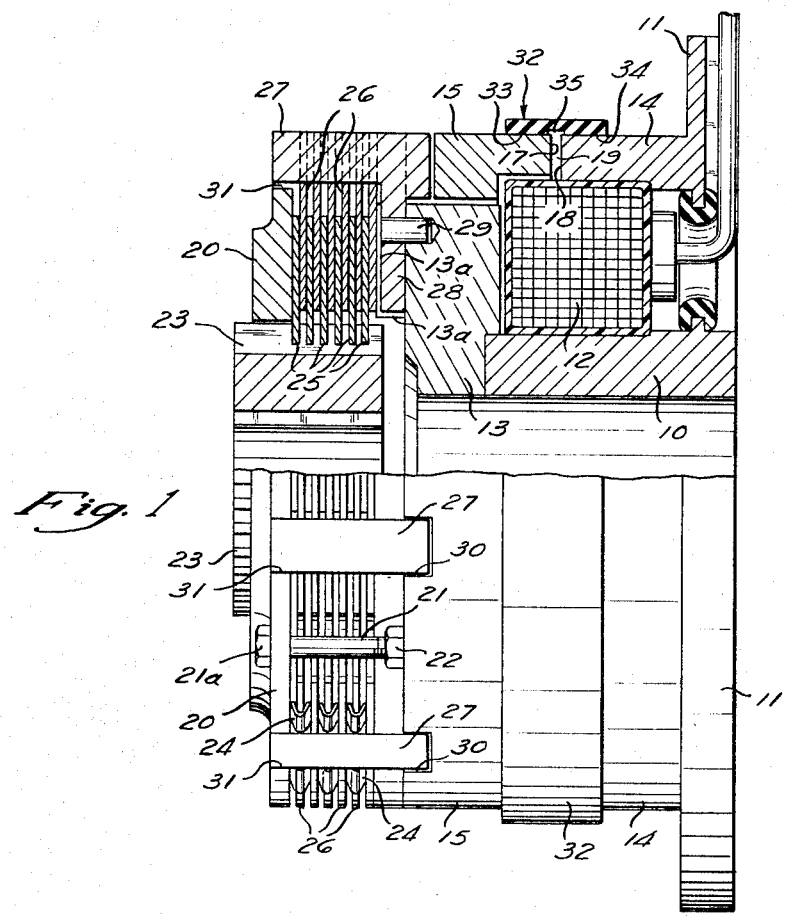

Nov. 8, 1966  J. A. MASON  3,283,865
ELECTROMAGNETIC TORQUE-SUSTAINING COUPLING WITH AIR GAP SEAL
Filed Oct. 19, 1964

INVENTOR.
JAMES A. MASON
BY
Ely, Golrick & Flynn
ATTORNEYS

United States Patent Office 3,283,865
Patented Nov. 8, 1966

3,283,865
ELECTROMAGNETIC TORQUE-SUSTAINING COUPLING WITH AIR GAP SEAL
James A. Mason, Shaker Heights, Ohio, assignor to Fawick Corporation, a corporation of Michigan
Filed Oct. 19, 1964, Ser. No. 404,772
3 Claims. (Cl. 192—84)

This invention relates to an electromagnetic torque-sustaining coupling suitable for use as a brake or clutch and having an air gap seal.

Various types of electromagnetically operated brakes and clutches now in use have an operating air gap between an electromagnet field body, which is inductively associated with an electrically energizable coil to have magnetic flux induced therein when the coil is energized, and a magnetically attractable armature mounted for movement toward or away from the field body in response to energization of the coil. In practical use, such as in textile mills, such brakes and clutches may be exposed to lint or other extraneous particles which can gradually clog up the operating air gap and interfere with the proper operation of the brake or clutch.

The present invention is directed to an electromagnetic torque-sustaining coupling usable as a brake or clutch and having a novel and improved air gap seal which effectively prevents lint or other extraneous particles from collecting in the operating air gap.

Accordingly, it is a principal object of this invention to provide an electromagnetic torque-sustaining coupling having a novel and improved seal for its operating air gap.

Another object of this invention is to provide an electromagnetic torque-sustaining coupling having such an operating air gap seal which enables the operating air gap to be conveniently accessible for measurement, when desired.

Another object of this invention is to provide an electromagnetic torque-sustaining coupling having such an operating air gap seal which may be easily and inexpensively applied to the coupling and which inherently maintains itself in its most effective gap-sealing position on the coupling.

Another object of this invention is to provide an electromagnetic torque-sustaining coupling having such an operating air gap seal which does not substantially retard the movement of the armature in either direction, but yet effectively seals the operating air gap against the entry of extraneous particles, such as lint.

Further objects and advantages of this invention will be apparent from the following detailed description of a particular magnetic brake having the present air gap seal thereon and shown in the accompanying drawing.

Figure 2:
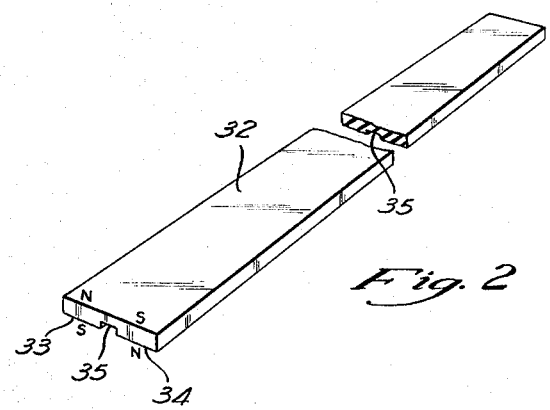

In the drawing:

FIGURE 1 is a view, partly in elevation and partly in axial section, of a magnetic brake having the present air gap seal thereon; and FIGURE 2 is a broken perspective view showing the air gap sealing strip before it is applied to the brake.

Referring to FIG. 1, the particular magnetic brake shown therein is merely illustrative of the general type of brake or clutch which may embody the present air gap seal. In the particular embodiment shown in FIG. 1, the brake is electromagnetically-engaged and spring-released. However, it is to be understood that the present invention may be provided on brakes which are spring-applied and electromagnetically-released, as well as on clutches which are either electromagnetically-applied and spring-released or vice-versa.

The brake of FIG. 1 comprises a stationary brake body 10 having a mounting flange 11 at its back end. The body rigidly supports an electrically energizable, annular coil 12 and an annular front plate 13 in front of the coil. An outer field body member in the form of an outer field ring 14 is rigidly attached to the body 10 and snugly surrounds the coil 12 for somewhat more than one-half of the latter's axial extent. The members 10, 13 and 14 are of ferromagnetic material and together they constitute a stationary housing and electromagnet field body in inductive relationship to the coil 12.

An annular ferromagnetic armature 15 slidably surrounds the front plate 13. The back end of armature 15 and the front end of the outer field ring 14 present confronting, axially-facing, annular pole faces 17 and 18 respectively, which together define the axial operating air gap 19 of the brake when the coil 12 is de-energized.

A rigid pressure plate 20 is adjustably spaced in front of, and rigidly connected to, the armature 15 by a plurality of adjustable bolts 21 and lock nuts 22. Each bolt 21 has a screw-threaded end which is threadedly engaged in the armature 15 and a head 21a at its opposite end which bears against the outer face of the pressure plate 20. This pressure plate rotatably receives a gear 23, which is adapted to be connected to the shaft (not shown) whose rotation is to be stopped by the brake.

A first set of axially spaced friction discs or plates 25 are splined to the outside of gear 23 for rotation in unison therewith. These discs are slidable longitudinally of the gear.

Interleaved with the friction discs of the first set are a second set of friction discs or plates 26. The discs 26 of the second set are externally splined to a plurality of circumferentially spaced drive fingers 27. Each of these fingers has an integral radially inwardly projecting flange 28 which is snugly received in a respective slot 13a formed in the front plate 13. A pin 29 connects each drive finger flange 28 to the front plate 13. With this arrangement, the several drive fingers are coupled to the front plate 13, so that there is no relative rotation between them.

As shown in the lower half of FIG. 1, the armature 15 has circumferentially spaced, longitudinal slots 30 at its front end which snugly, but slidably, receive the back ends of the respective drive fingers 27. The pressure plate 20 also has circumferentially spaced, longitudinally extending external slots 31 which snugly, but slidably, receive the front ends of the drive fingers 27. The drive fingers 27 couple the pressure plate 20 and the armature 15 to each other against rotation of one with respect to the other. When the device is used as a brake, the body 10, 13, 14 is stationary, and the armature 15 and pressure plate 20 are both positively restrained against rotation, while being adapted to move axially, or longitudinally, of the assembly.

A plurality of release springs 24 bias the friction discs 26 of the second set apart from each other, and the force of these springs is imparted to the pressure plate 20, urging it to the left in FIG. 1 against the bolt heads 21a. The armature 15 also is retracted to the left, to the position shown in FIG. 1, due to its rigid connection (by the bolts 21) to the pressure plate 20. Accordingly, normally the friction discs 25 and 26 of the first and second sets are out of torque-sustaining frictional engagement with each other, and gear 23 is free to rotate. Also, the confronting pole faces 17 and 18 of the armature 15 and the outer field ring 14 are spaced from each other by the operating air gap 19. The axial length of this air gap may be adjusted by adjusting the bolts 21, after first loosening the lock nuts 22.

When the coil 12 is energized, the armature 15 is magnetically attracted to the right in FIG. 1, reducing the air gap 19 and, through the rigid connections provided by the bolts 21 and lock nuts 22, pulling the pressure plate 20 to the right to bring the interleaved friction plates 25 and 26 into torque-sustaining, braking engagement with each other so as to stop the gear 23 from continued rotation.

In accordance with the present invention a novel seal is provided for the operating air gap 19 at the outside of the brake, which in the absence of this seal would ordinarily be exposed to extraneous particles, such as lint. This seal is in the form of a flexible strip 32 of so-called "magnetic rubber" surrounding the air gap 19 and sealingly engaging the armature 15 and the outer field ring 14 on opposite sides of the air gap around the complete circumference of the brake. This flexible strip comprises a non-magnetic binder of rubber-like material and small particles of low permeability, high coercive force, permanent magnetic material such as barium ferrite, embedded therein. In the present instance, the binder or base material of the sealing strip is nitrile rubber to withstand high operating temperatures. As shown in FIG. 2, the strip 32 presents a sealing face having oppositely polarized, continuous, lengthwise surfaces 33 and 34 on opposite sides of a central longitudinal slot 35. For example, the surface 33 may be permanently magnetized "South" along its entire length and the surface 34 permanently magnetized "North" along its entire length.

When applied to the brake of FIG. 1, the surface 33 on the magnetic strip 32 sealingly engages the outside of armature 15 and the opposite polarity surface 34 sealingly engages the outside of the outer field ring 14. The magnetic field at the sealing face of the strip 32 extends from its permanently magnetized "North" surface 34 through the outer field ring 14 of the brake, across the operating air gap 19, and through the armature 15 to the permanently magnetized "South" surface 33. The magnetic strip 32 exerts sufficient magnetic force to effectively adhere to the outside of the brake on opposite sides of the operating air gap 19, and thereby to effectively seal the air gap against the entry of extraneous matter, such as lint. However, the magnetic strip 32 does not appreciably retard the longitudinal or axial movement of the armature toward or away from the outer field ring 14 when the coil 12 is energized or de-energized. When such movement of the armature takes place, its outer face merely slides over the sealing face 33 of the magnetic strip 32 without displacing the sealing strip longitudinally with respect to the stationary parts of the brake.

The slot 35 is at a magnetically neutral location on the magnetic sealing strip, so that it should register with the operating air gap 19 when the sealing strip is applied to the brake. However, even if the sealing strip is carelessly applied to the brake initially, the magnetically neutral slot 35 on the sealing strip will automatically line up with the operating air gap 19 in the brake after one operation of the brake.

A particular advantage of the present sealing arrangement is that the sealing strip may be readily removed manually whenever the operating air gap 19 has to be measured, such as when the bolts 21 are being adjusted to compensate for the wear which has taken place on the friction discs. Such adjustments may be made three to six times during the operating life of the brake or clutch, and therefore it is highly desirable that the operating air gap be accessible for this purpose. After the adjustment has been made, the sealing strip is simply re-applied to the brake or clutch so that it again adheres magnetically to the outer field ring and the armature near the air gap.

While a specific illustrative example of a magnetic brake having the present air gap seal thereon has been shown and described, it is to be understood that the present invention may be embodied in various other types of magnetic brakes or clutches differing from the particular example shown. Also, the sealing strip may differ from the particular embodiment shown without departing from the spirit and scope of this invention. For example, the sealing face of the strip may be continuous throughout, with no slot at the magnetically neutral longitudinal centerline, if desired.

I claim:

1. On an electromagnetic torque-sustaining coupling having an operating air gap, a flexible permanent magnet sealing strip overlying said air gap and magnetically adhering to the coupling on opposite sides of the air gap, said sealing strip being manually removable from said coupling to permit measurement of said air gap.

2. An electromagnetic torque-sustaining coupling comprising an outer body portion having a pole face, a magnetically attractable armature movable toward and away from said pole face and having a pole face in confronting relationship to said first-mentioned pole face and defining therewith an air gap, electrically energizable coil means in inductive relationship to said outer body portion for inducing magnetic flux therein to attract said armature to reduce said air gap when the coil is energized, and a flexible permanent magnet sealing strip surrounding said air gap and presenting permanently magnetized sealing surfaces which magnetically adhere respectively to the outside of said outer body portion and to the outside of said armature on opposite sides of said air gap, said sealing strip being manually removable from said coupling to permit measurement of said air gap.

3. An electromagnetic torque-sustaining coupling comprising an electromagnet field body including an outer field ring having an annular axially-facing pole face, a magnetically attractable annular armature movable toward and away from said outer field ring and having an annular axially-facing pole face in confronting relationship to said pole face of the outer field ring and defining therewith an annular axial air gap at the outside of the outer field ring and the armature, electrically energizable coil means in inductive relationship to said electromagnet field body for inducing magnetic flux therein to attract said armature toward said outer field ring to reduce said air gap when the coil is energized, relatively rotatable torque-sustaining members engageable with each other in response to movement of the armature in one direction and releasable from each other in response to movement of the armature in the opposite direction, and a flexible sealing strip surrounding said air gap and presenting permanently magnetized, opposite polarity sealing surfaces which magnetically adhere respectively to the outside of said outer field ring and to the outside of said armature around the complete peripheries thereof adjacent their confronting pole faces, said sealing strip being manually removable from the outer field ring and the armature.

References Cited by the Examiner

UNITED STATES PATENTS

| | | | |
|---|---|---|---|
| 2,959,832 | 11/1960 | Baermann | 277—80 X |
| 2,965,203 | 12/1960 | White. | |
| 3,190,420 | 6/1965 | Kampf | 192—84 |

DAVID J. WILLIAMOWSKY, *Primary Examiner.*

A. T. McKEON, *Assistant Examiner.*